United States Patent [19]

Hornung et al.

[11] Patent Number: 5,323,474
[45] Date of Patent: Jun. 21, 1994

[54] LOSSLESS OPTICAL SIGNAL SPLITTER INCLUDING REMOTELY PUMPED AMPLIFIER

[75] Inventors: Stephen Hornung, Norfolk; Christopher Rowe, Ipswich, both of England

[73] Assignee: British Telecommunications plc, London, England

[21] Appl. No.: 867,687
[22] PCT Filed: Dec. 14, 1990
[86] PCT No.: PCT/GB90/01950
§ 371 Date: Jul. 9, 1992
§ 102(e) Date: Jul. 9, 1992
[87] PCT Pub. No.: WO91/09475
PCT Pub. Date: Jun. 27, 1991

[30] Foreign Application Priority Data

Dec. 14, 1989 [GB] United Kingdom ............ 8928237

[51] Int. Cl.$^5$ .................................. G02B 6/28
[52] U.S. Cl. ......................... 385/24; 372/6; 385/141
[58] Field of Search ............ 385/89, 15, 24, 31, 385/45, 141, 142, 144, 88; 372/6, 66; 359/114, 115, 109, 173, 321, 341

[56] References Cited

U.S. PATENT DOCUMENTS

| | | | |
|---|---|---|---|
| 4,318,058 | 3/1982 | Mito et al. | 385/49 |
| 4,457,581 | 7/1984 | Johnson et al. | 385/24 |
| 4,545,253 | 10/1985 | Avicola | 73/655 |
| 4,682,843 | 7/1987 | Mahlein et al. | 385/45 |
| 4,712,859 | 12/1987 | Albanese et al. | 385/24 |
| 4,787,693 | 11/1988 | Kogelnik et al. | 385/46 |
| 4,859,016 | 8/1989 | Shaw et al. | 385/5 |
| 4,863,231 | 9/1989 | Byron et al. | 385/46 |
| 4,938,556 | 7/1990 | Digonnet et al. | 385/27 |
| 4,962,995 | 10/1990 | Andrews et al. | 385/423 |

FOREIGN PATENT DOCUMENTS

| | | |
|---|---|---|
| 0242802 | 10/1987 | European Pat. Off. . |
| 0248517 | 12/1987 | European Pat. Off. . |
| 59-126696 | 7/1984 | Japan . |
| WO86/07221 | 12/1986 | PCT Int'l Appl. . |
| 8600430 | 1/1987 | PCT Int'l Appl. . |

OTHER PUBLICATIONS

*Optical Communication* (ECOC '89), Sep. 10–14, 1989, vol. 3, pp. 29–32, Nishi et al.: "1.8Gb/s 310 km Fiber Transmission Without Outdoor Repeater Equipment Using a Remotely Pumped In-Line Er-Doped Fiber Amplifier in an IM/Direct-Detection System".

*Optical Communication* (ECOC '89), Sep. 10–14, 1989, vol. 3, pp. 33–36, "Non-Regenerative Optical Transmission Experiment Using 12 Er-Doped Fibre Amplifiers," by Edagawa et al.

*Primary Examiner*—Rodney B. Bovernick
*Assistant Examiner*—John Ngo
*Attorney, Agent, or Firm*—Nixon & Vanderhye

[57] ABSTRACT

A lossless optical component includes an input and at least one output. The optical component includes an operational portion and an amplifier portion upstream of the operational portion. The amplifier portion includes an optical amplifier for amplifying optical signals received by the input. The optical amplifier is provided with input optical waveguide via which the optical amplifier is optically pumpable by a remote pump laser. The output of the optical amplifier is proportional to the loss of the operating portion of the optical component.

15 Claims, 2 Drawing Sheets

LOSSLESS OPTICAL SIGNAL SPLITTER INCLUDING REMOTELY PUMPED AMPLIFIER

This invention relates to an optical coupler for incorporation in an optical fibre communications network.

Throughout this specification, the term "optical" is intended to refer to that part of the electromagnetic spectrum which is generally known as the visible region, together with those parts of the infra red and ultra violet regions which are capable of being transmitted by dielectric waveguides such as optical fibres.

An optical fibre communications network is used to distribute information (optical signals) from one or more transmitting stations to one or more receiving stations. For telecommunications purposes, passive optical networks, such as TPON (telephone by passive optical networks), are advantageous in that they permit telecommunications over a network using a single transmitter (a laser located at an exchange connected to the network). The main advantage of TPON is that no electric components are required in the field. A disadvantage of TPON is that it requires the use of optical splitters to pass optical signals from a transmitter (exchange) to a plurality of receiving stations (customers' telephones). TPON is, therefore, limited by the loss at the splitters (typically a TPON system will service only 32 customers per laser). One way to increase this ratio would be to incorporate optical amplifiers into the system. This could be achieved by amplifying the optical signals by means of optical amplifiers at one or more positions along the network, for example by using a power amplifier at the transmitter, repeater amplifiers along the network paths, or pre-amplifiers at the receiving stations. In this connection, it should be noted that safety considerations limit the maximum power which can be delivered by the head end (exchange) laser.

A known type of optical amplifier employs an electric regenerator for boosting power to compensate for splitter losses. The disadvantages of electric regenerators are that they are expensive, directional and are not data transparent. Another known type of optical amplifier (the semiconductor laser amplifier) overcomes some of the disadvantages of using electric regenerators, in that a semiconductor laser amplifier is bi-directional and data transparent. Unfortunately, however, a semiconductor laser amplifier requires an electrical power source, and this detracts from the main advantage of TPON, namely having only passive components in the field.

The present invention provides an optical coupler having an input and a plurality of outputs, the optical component comprising a splitter portion and an amplifier portion upstream of the splitter portion, wherein the amplifier portion includes an optical amplifier for amplifying optical signals received by the input, the optical amplifier being provided with input optical wave guiding means via which the optical amplifier is optically pumpable by a remote pump laser, and wherein the optical amplifier has a gain which is at least equal to the loss of the splitter portion.

In a preferred embodiment, the optical amplifier is a doped fibre amplifier constituted by a length of $Er^{3+}$ doped fibre. Preferably, the input optical waveguiding means is connected to the doped fibre amplifier via a first WDM, and the first WDM is upstream of the doped fibre amplifier. In this case, the input may be connected to the first WDM, the doped fibre amplifier may be connected to the output via a second WDM, and the component may further comprise a filter downstream of the second WDM.

The invention also provides an optical system comprising an optical source, an optical coupler and a pump laser, the optical coupler being as defined above, the optical source being connected to the input of the optical coupler, and the pump laser being connected to the input optical wave guiding means.

Advantageously, the system further comprises an agc unit, the agc unit and pump laser being connected to the input optical wave guiding means by means of a further WDM. In the case where the input is connected to the first WDM, the input optical wave guiding means may be connected to the first WDM via another WDM, the downstream end of the doped fibre amplifier may be connected to said another WDM via a coupler. Preferably, the coupler is a 10/90 coupler which directs 10% of the output of the doped fibre amplifier to said another WDM. Alternatively, where the first WDM is downstream of the doped fibre amplifier, the input may be connected directly to the upstream end of the doped fibre amplifier.

Advantageously, the optical source is a laser which emits light at 1536 nm, in which case the optical amplifier is arranged to have its maximum amplification at this wavelength. Alternatively, the optical source may be constituted by first and second lasers which are connected to the input by an input WDM and an optical wave guide. Preferably, the first laser emits light at 1300 nm, and the second laser emits light at 1536 nm. In this case, the optical amplifier is arranged to have its maximum amplification at a wavelength of 1536 nm, the optical amplifier being transparent at 1300 nm. Conveniently, means are provided for modulating a plurality of radio carrier signals with video signals, and means are provided for mixing the modulated radio carriers, the resulting analogue signal being used to modulate the second laser. The pump laser may emit light at 1480 nm.

Two forms of optical transmission system, each of which incorporates a lossless coupler constructed in accordance with the invention, will now be described in detail, by way of example, with reference to the accompanying drawings, in which.

Figure 1:
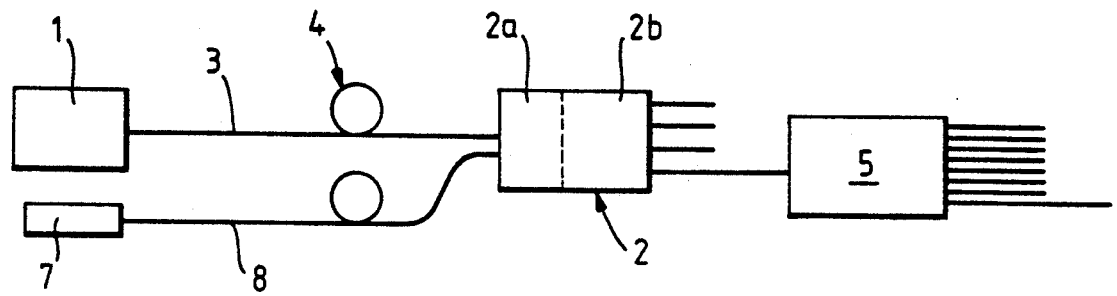
FIG. 1 is a schematic representation of the first form of optical transmission system.

Referring to the drawings, FIG. 1 shows a passive optical network (TPON) system having a signal laser 1 connected to a lossless coupler 2 by an optical fibre 3 which defines a 2 km signal path 4 (shown schematically). The laser 1 is a distributed feedback (DFB) laser which emits light at 1536 nm. The lossless coupler 2 includes an amplifier unit 2a and 4-way splitter 2b. Each of the outputs of the splitter 2b leads to a respective 8-way splitter 5 (only one of which is shown). The system is such, therefore, the signals from the laser 1 can be transmitted to 32 receiving stations (not shown) associated with the outputs of the splitters 5. The amplifier unit 2a is arranged to provide sufficient amplification to signals arriving along the signal path 4 to compensate for the loss associated with the splitter 2b. This ensures that the power budget of the system is adequate to power the 32 receiving stations.

The amplifier unit 2a (see FIG. 2) includes a doped fibre amplifier 6 constituted by a length of $Er^{3+}$ doped fibre. The amplifier 6 is pumped optically by a high power pump laser 7, via a dedicated optical fibre 8. The laser 7 is a 40 mW, 1480 nm laser, though a higher power laser could be used with advantage. Because of the high power of the pump laser 7, the optical fibre 8 needs to be protected and armoured to protect personnel from the high light levels carried thereby. The optical fibre 8 (termed the optical main) is, therefore, analogous to an electric power cable, and the optical fibre 3 is analagous to an electrical signal cable. As with electrical connections, the optical signal and power fibres 3 and 8 are kept separate, and are clearly marked accordingly.

The amplifier unit 2a also includes two WDMs 9a and 9b positioned at opposite ends of the fibre amplifier 6. The WDM 9a multiplexes the 1480 nm pump and the 1536 nm signal, and inputs the multiplexed light to the fibre amplifier 6. The WDM 9b demultiplexes the light amplified by the amplifier 6, and outputs the demultiplexed light to a ferrule filter 10. The filter 10 is a band pass filter having a narrow pass range of 1530 nm to 1540 mm (though this could, with advantage, be narrower), and so is effective to filter out any excess light from the pump laser 7. The filter 10 also removes noise, that is to say any unwanted spontaneous emissions from the doped fibre amplifier 6.

The amplifier 6 has a gain of 6 dB which is just sufficient to compensate for the loss in the splitter 2b. Consequently, the coupler 2 is essentially a lossless coupler. This lossless coupler 2 has a number of important advantages, namely:

(i) It utilises an optical amplifier 6 that amplifies the signal directly without recourse to electronics.
(ii) The amplifier 6 is pumped optically from a remote position, so there is no need for a separate power supply for the amplifier in the cabinet which houses the coupler 2.
(iii) By removing the loss associated with the first splitter 2b, power levels are maintained fairly constant throughout the system, and this leads to a safer system which is easier to maintain. It also facilitates the location of faults.
(iv) The increased power available downstream of the splitter 2b facilitates extension of the system. Thus, the system could support a greater splitting ratio, so that up to 128 customers could be serviced by a single laser. The increased power also permits the use of cheaper components (such as low power lasers and cheaper receivers), thereby making the system more cost-effective.
(v) It is bi-directional, and can be used with both digital and analogue systems.

The amplifier unit 2a is a co-propagating amplifier, that is to say the pump power passes along the fibre amplifier 6 in the same direction as the signal. The co-propagating amplifier could, however, be replaced by a counter-propagating amplifier, that is to say one in which the pump passes along the fibre amplifier 6 in the opposite direction to the signal. A co-propagating amplifier has the advantage of being optically quieter than a counter-propagating amplifier, but has the disadvantage of requiring additional optical filtering downstream (in the direction of signal propagation) of the amplifier to remove excess pump power. Conversely, a counter-propagating amplifier has the disadvantage of being relatively optically noisy, but has the advantage of not requiring optical filtering (except perhaps upstream of the amplifier at, for example, a head end receiver). A counter-propagating amplifier also has the advantage of a higher output power.

Although the coupler 2 described above is inherently lossless when initially installed, this may not be the case as the system ages. The reasons for this are:

(a) Lasers age, reducing their output power with time. Although this is not normally too much of a problem, this is not the case with a pump laser. Thus, the gain of the amplifier 2a is exponentially dependant upon the pump power, so that a small change in pump power leads to a much larger change in the output of the amplifier.
(b) The fibre link 8 to the coupler 2 is sensitive to environmental effects. Thus, although a 0.5 dB change in fibre loss is insignificant to a normal system, this deviation in pump power would be serious. For example, if the amplifier 2a has a gain of 20 dB, a 0.5 dB decrease in pump power reduces the amplifier gain to about 18 dB.

An obvious solution to these ageing problems is to sample the output by reflecting some of the amplifier output back towards the pump laser. Unfortunately, this is not practical with a fibre amplifier, as the reflection will cause the amplifier to oscillate, that is to say to act as a laser.

Figure 3:
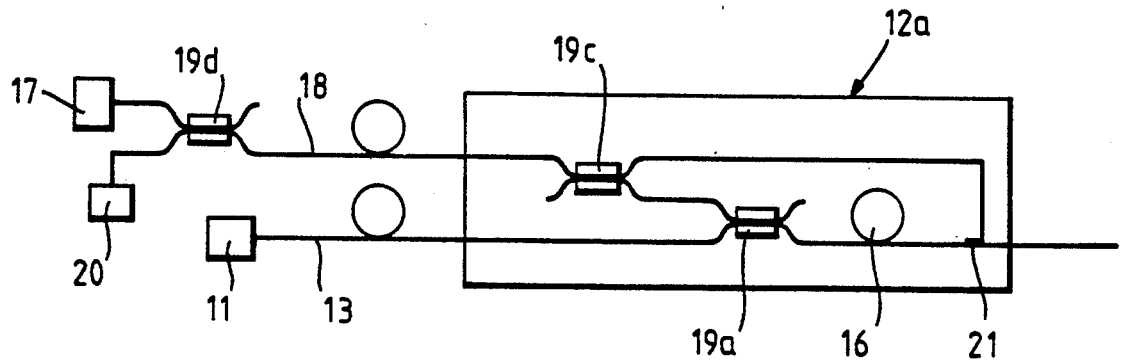
FIG. 3 is a schematic representation showing a modified form of part of the system of FIG. 1.
Figure 4:
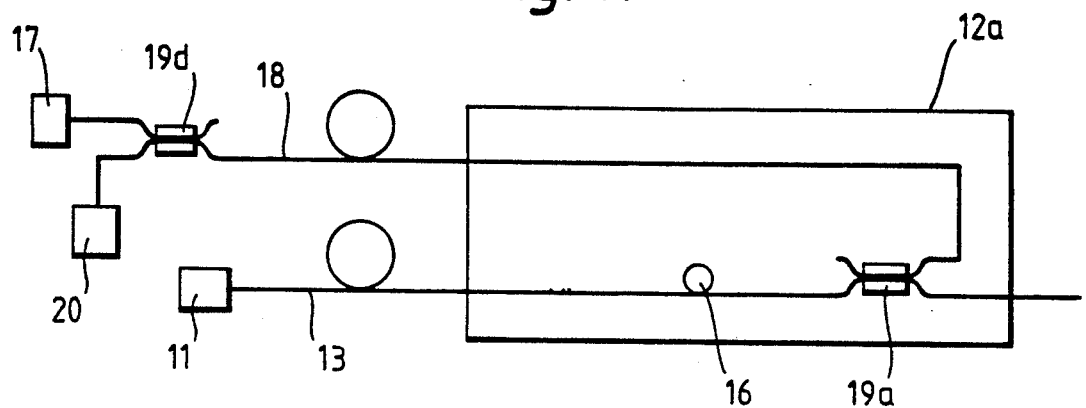
FIG. 4 is a schematic representation showing another modified form of part of the system of FIG. 1.

FIGS. 3 and 4 show two solutions to the ageing problems, both of these solutions relying upon automatic gain control (agc) to stabilise the output power of the amplifier. Thus, FIG. 3 is a schematic representation of that part of a TPON system which is equivalent to the system of FIG. 1 from its head end to its amplifier unit. FIG. 3 shows a signal laser 11 connected to an amplifier unit 12a by an optical fibre 13. The amplifier unit 12a includes a doped fibre amplifier 16 constituted by a length of $ER^{3+}$ doped fibre. The amplifier 16 is pumped optically by a high power pump laser 17, via a dedicated optical fibre 18. A WDM 19a upstream of the amplifier 16 connects the amplifier to the fibre 13 and 18, an additional WDM 19c being positioned in the fibre 18 leading to the WDM 19a. The pump laser 17 and an agc unit 20 are connected to the fibre 18 by means of a further WDM 19d. A 90/10 coupler 21 downstream of the amplifier 16 feeds 10% of the amplifier's output to the WDM 19c.

The arrangement shown in FIG. 3 operates in the following manner. As with the embodiment of FIGS. 1 and 2, pump power travels to the amplifier 16 separately from the signal. Pump power travels through the WDMs 19c and 19a to reach the amplifier 16, and 10% of the amplifier's output (the returned signal) is fed back to the fibre 18 via the WDM 19c. The WDM 19d separates the returned signal from the outgoing pump laser signal and feeds it to the agc unit 20. If this unit 20 detects a drop in the returned signal (which is proportional to a drop in the amplified signal leaving the amplifier unit 12a), it increases the output of the pump laser 17 to compensate for the fall in the output of the amplifier 16. In this way, the output of the amplifier unit 12a is stabilised. Apart from this, the main advantage of this arrangement is that it is very stable, and so is usable with both co-propagating and counter-propagating amplifiers. One possible disadvantage, which may be important in some configurations, is its component count and hence its cost. Also, pump power has to pass through three WDMs, and so will suffer extra loss before it reaches the amplifier unit 12a.

FIG. 4 shows an alternative agc stabilised arrangement which has a lower component count. This arrangement is similar to that shown in FIG. 3, so like reference numerals will be used for like parts, and only the parts which are different will be described in detail. Thus, the amplifier 16 of the FIG. 4 arrangement is a counter-propagating amplifier, so the WDM 19a is positioned downstream of the amplifier. This arrangement relies on the inherent imperfections of WDMs which allows a small amount of the output signal of the amplifier 16 to "leak" across the WDM 19a into the fibre 18, and hence back to the agc unit 20 via the WDM 19d. As mentioned above, the main advantage of this arrangement is its low component count. A possible disadvantage of the arrangement is its reliance on the stability of the WDM 19a. If this drifts more than negligibly, the agc reference signal (that is to say the returned signal) will change, thus altering the output of the amplifier 16.

The arrangements of FIGS. 3 and 4 each use an agc unit which relies on an ac agc technique. The reason for using an ac technique is as follows. Generally an agc unit compares the output signal of a component to be regulated with a set reference, and changes the gain of the amplifier to keep this constant. The simplest method is to detect the mean output of the signal, that is to say the 'dc' level. Unfortunately, this technique has problems when used with a fibre amplifier, because of spontaneous emission and the excess pump light. The agc unit cannot distinguish between the signal and these other sources. One option is to use optical filtering, but this limits the bandwidth over which the unit can be used.

The ac technique involves adding a small extra amplitude modulation on top of the normal signal. This will not interfere with the most popular transmission methods (digital or frequency modulation). The agc unit is sensitive to signals only at this frequency. Hence, the excess pump and spontaneous emission, which are essentially constant, are ignored. This needs no optical filtering and so the full optical bandwidth of the amplifier can be used.

Figure 5:
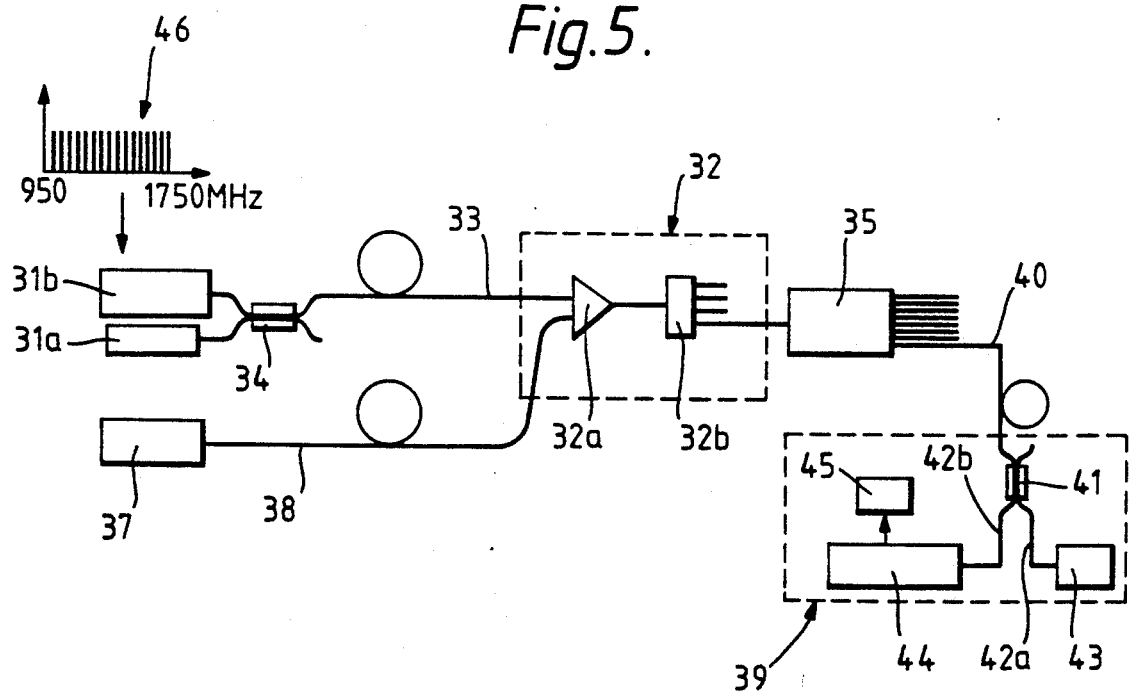
FIG. 5 is a schematic representation of the second form of optical transmission system.

As the type of lossless coupler described above is bi-directional, systems can be constructed which permit two separate types of signal to be carried with different power budgets at different frequencies. A system of this type will now be described with reference to FIG. 5. FIG. 5 shows a passive optical network system having two signal lasers 31a and 31b connected to a lossless coupler 32 by an optical fibre 33 and a WDM 34 which multiplexes the signals from the two lasers onto the optical fibre. The laser 31a is a Fabry Perot laser which emits light at 1300 nm, and the laser 31b is a DFB laser which emits light at 1536 nm. The laser 31a is a standard TPON laser, so that the network can operate as a TPON network (i.e. a 2-way time multiple access 20 Mb/s digital telephony system). The laser 31b is used to upgrade the network to BPON (broadband passive optical network), in a manner described below.

Figure 2:
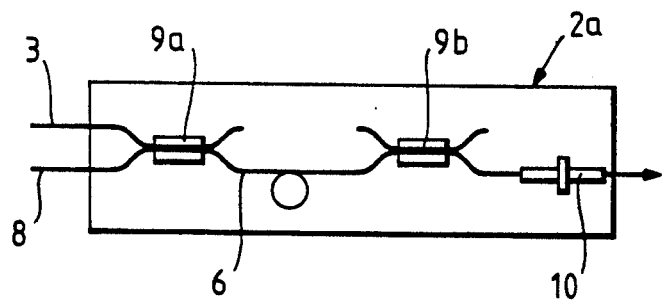
FIG. 2 is a schematic representation of the amplifier unit which forms part of the system of FIG. 1.

The lossless coupler 32 includes an amplifier unit 32a and a 4-way splitter 32b, these devices being identical to the corresponding parts of the coupler 2 of FIGS. 1 and 2. Thus, the amplifier unit 32a includes a fibre amplifier and a pair of WDMs. The WDMs pass both 1.55 $\mu$m and 1.3 $\mu$m signals, the 1.55 $\mu$m signal being amplified whilst the 1.3 $\mu$m signal can pass through the amplifier with little loss. The amplifier is pumped optically by a high power (40 mW, 1480 nm) laser 37, via a dedicated optical fibre 38. As with the embodiment of FIGS. 1 and 2, each output of the splitter 32b leads to a respective 8-way splitter 35 (only one of which is shown), so that the system can service 32 receiving stations 39 (only one of which is shown) via respective output fibres 40. Each receiving station 39 includes a WDM 41 for demultiplexing the 1300 nm and 1536 nm signals carried by the associated fibre 40. The WDM 41 has two output fibres 42a and 42b which lead respectively to a telephone instrument 43 and a receiver 44. The receiver 44 is a low cost PIN receiver which feeds signals to a down converter 45 to recover BPON signals.

BPON permits the transmission of many (16 or 32 typically) channels of video on a sub-carrier multiplexed system. In the embodiment shown in FIG. 5, 16 or 32 radio carriers at 950–1750 MHz are modulated, at 46, with video signals. The modulated carriers are then mixed together, and the resultant analogue signal is used to modulate the laser 31b for transmission down the optical fibre 33. The amplifier and associated WDMs are transparent at 1300 nm, so TPON signals are unaffected by the lossless coupler 32. This permits the network to carry both TPON and BPON signals, with both transmitters (the lasers 31a and 31b) being situated at the head end (the exchange). This is an improvement over known BPON systems, which require four lasers to service 32 customers, whereas the system of FIG. 5 requires only one laser per 32 customers. As the lasers needed for BPON cost about 3000, it will be apparent that the system of FIG. 3 gives a substantial cost saving. The system could also be extended, for example to complement TPON systems in which 128 customers are serviced by a single TPON laser, by increasing the splitting ratio for both TPON and BPON signals. Furthermore, known BPON systems require the use of expensive avalanche photodiodes (APDs) at the receiving stations instead of the cheap PINs used in the system of FIG. 5. Here again, therefore, the system of the invention leads to a substantial cost reduction. This system has the additional advantage that an entire TPON network can be installed with lossless couplers adapted to amplify BPON signals, and this network can be subsequently converted to dual TPON/BPON operation merely by the addition of the BPON transmission equipment and the pump laser at the exchange.

It would, of course, be possible to modify the system of FIG. 5 by the inclusion of an agc unit in association with the pump laser 37. In this way, the output of the amplifier unit 32a can be stabilised, even over extended periods of use.

It would also be possible to operate both TPON and BPON at about 1500 nm, in which case both types of signal would be amplified at the lossless coupler. Unfortunately, this would require the use of very narrow channel spacing demultiplexers (one per customer) and this would, at the present time, be prohibitively expensive.

An important advantage of using lossless couplers in optical transmission networks, is that they permit the use of any combination of simplex, duplex, analogue and digital transmission systems. Moreover, because this type of lossless coupler incorporates an optical amplifier, it does not require conversion to electronics for signal amplification. Consequently, this type of lossless coupler is data transparent, that is to say it permits data to be transmitted at any data transmission rate. This is to be compared with known arrangements which incorporate electrical amplifiers (regenerators) which operate successfully only over a narrow range of data transmission rates.

Although the signal lasers 1, 11 and 31b are stated to emit light at 1536 nm, it will be understood that these lasers could emit light at other wavelengths, typically within the range of from 1530 nm to 1565 nm.

We claim:

1. An optical coupler having an input and a plurality of outputs, the optical coupler comprising:

a splitter portion having a splitter input for receiving an optical signal an plural outputs providing respective fractions of the input optical signal therefrom and also having an amplifier portion connected to supply optical signals to said splitter input upstream of the splitter portion, the amplifier portion including an optical amplifier for amplifying optical signals received by the coupler input, the optical amplifier being provided with input optical waveguiding means via which the optical amplifier is optically pumpable by a remote pump laser, the amplifier having an optical signal gain which is at least equal to the optical signal loss of the splitter portion;

the optical amplifier being a doped fiber amplifier;

the input optical waveguiding means being connected to the doped fibre amplifier via a first WDM upstream of the doped fiber amplifier;

the doped fibre amplifier being connected to the output via a second WDM; and a filter downstream of the second WDM.

2. An optical coupler having an input and a plurality of outputs, the optical coupler comprising:

a splitter portion having a splitter input for receiving an optical signal and plural outputs providing respective fractions of the input optical signal therefrom and also having an amplifier portion connected to supply optical signals to said splitter input upstream of the splitter portion, the amplifier portion including an optical amplifier for amplifying optical signals received by the coupler input, the optical amplifier being provided with input optical waveguiding means via which the optical amplifier is optically pumpable by a remote pump laser, the amplifier having an optical signal gain which is at least equal to the optical signal loss of the splitter portion;

the optical amplifier being a doped fiber amplifier;

the input optical waveguiding means being connected to the doped fibre amplifier via a first WDM; and the first WDM being downstream of the doped fibre amplifier.

3. An optical system comprising an optical source, an optical coupler and a pump laser, the optical coupler being as claimed in claim 2, the optical source being connected to the input of the optical coupler, and the pump laser being connected to the input optical wave guiding means.

4. A system as claimed in claim 3, further comprising an agc unit, the agc unit and said pump laser being connected to the input optical waveguiding means by means of a further WDM.

5. A system as claimed in claim 4, wherein the input optical wave guiding means is connected to the first WDM via another WDM.

6. A system as claimed in claim 5, wherein the downstream end of the doped fibre amplifier is connected to said another WDM via a coupler.

7. A system as claimed in claim 6, wherein the coupler is a 10/90 coupler which directs 10% of the output of the doped fibre amplifier to said another WDM.

8. A system as claimed in claim 4, wherein the input is connected directly to the upstream end of the doped fibre amplifier.

9. A system as claimed in claim 3, wherein the optical source is a laser which emits light at 1536 nm.

10. A system as claimed in claim 3, wherein the optical source is constituted by first and second lasers which are connected to the input by a WDM and an optical wave guide.

11. A system as in claim 10, wherein the first laser emits light at 1300 nm, and the second laser emits light at 1536 nm.

12. A system as claimed in claim 11, wherein the first and second WDMs pass light at 1300 nm and at 1536 nm.

13. A system as claimed in claim 11, wherein means are provided for modulating a plurality of radio carrier signals with video signals, and means are provided for mixing the modulated radio carriers, the resulting analogue signal being used to modulate the second laser.

14. A system as claimed in claim 3, wherein the pump laser emits light at 1480 nm.

15. A substantially lossless optical signal splitter component for use in an optical signal distribution network, said component comprising:

an optical information-bearing signal input port;

an optical pump port;

a plurality of optical information-bearing signal output ports;

an optical signal amplifier coupled to amplify optical information-bearing signals via said input port using optical pump power from said optical pump port;

an optical signal splitter having an input port coupled to receive amplified optical information-bearing signals from said amplifier and to provide a respectively corresponding portion thereof to each of said output ports;

a source of optical pump power remotely located away from said component and connected to said pump port via an optical fibre waveguide separate from an optical fibre waveguide carrying optical information-bearing signals to be distributed via said network; and means for returning a portion of an ac agc signal that has been amplified by said amplifier in said component to said remotely located source of optical pump power; and means located proximate said source for adjusting the power of optical pump signals provided from said source to said pump port as a function of said returned ac agc signal.

* * * * *